United States Patent [19]

Clark, II et al.

[11] Patent Number: 5,546,986
[45] Date of Patent: Aug. 20, 1996

[54] LEAKPROOF DUAL ACTION FLUID TRANSFER VALVE

[75] Inventors: James E. Clark, II, Ojai, Calif.; Poul Van Santen, Rotterdam, Netherlands

[73] Assignee: Clark Technology Systems, Inc., Santa Paula, Calif.

[21] Appl. No.: 384,947

[22] Filed: Feb. 7, 1995

[51] Int. Cl.⁶ .................................................. F16L 29/00
[52] U.S. Cl. ............................. 137/614.05; 137/614.21
[58] Field of Search ...................... 137/614.04, 614.03, 137/614.02, 614, 614.05, 614.21; 251/149.6, 149.5

[56] References Cited

U.S. PATENT DOCUMENTS 2,218,318  10/1940  Pfauser .................. 137/614.04
2,518,299  8/1950  Fernandez ............ 137/614.04 X
3,574,314  4/1971  Quercia ................. 137/614.05 X
4,509,554  4/1985  Failla .................... 137/614.04 X

*Primary Examiner*—Kevin Lee
*Attorney, Agent, or Firm*—Drucker & Sommers

[57] ABSTRACT

A leakproof dual action valve which is operated by its relative state of engagement and disengagement to a complementary, mating spring-actuated valve connected to a fluid supply. The dual action valve has a sleeve member, a piston carrier portion, a piston body, and a valve. As the sleeve member of the dual action valve is screwed onto the mating spring actuated valve, the piston body simultaneously pushes open both the dual action valve and the spring actuated valve. When the sleeve member is unscrewed from the mating spring actuated valve, both valves close, thereby preventing and leakage of fluid. The dual action valve is adapted to connect to a vacuum hose, which will evacuate any fluid from the fluid supply.

4 Claims, 3 Drawing Sheets

5,546,986

LEAKPROOF DUAL ACTION FLUID TRANSFER VALVE

BACKGROUND OF THE INVENTION

1. Field of the Invention

This invention is related to the field of valves, and more particularly to leakproof valves which can only be opened and closed by their state of engagement or disengagement with particular mating valves, to thereby eliminate the possibility of a valve being accidentally opened when it is not connected to a proper mating valves, to therefore prevent the accidental release of fluid into the environment.

2. State of the Prior Art

There are many different styles of valves for use in controlling the flow of fluid between different points in a system. These include gate valves, ballcock valves, and quick connect snap together style valves, which are used to gain pneumatic hoses, such as are widely used in auto repair garages. While snap together valves are acceptable for air, they are not acceptable for fluids, since some fluid escapes when the two mating parts of the valve are connected or disconnected. In the case of fluids such as oil, any such leakage is unacceptable.

In the field of motor oil changing for vehicles, the traditional method to conduct an oil change has been to remove the oil pan drain bolt, allow the oil to drain by gravity into a collection pan or drum, replace the oil drain pan bolt, and then refill the oil drain pan with clean motor oil. The co-inventor herein James E. Clark has invented a vehicle waste oil recovery and delivery system to remove old oil and delivery new oil to a vehicle for which U.S. patent application Ser. No. 08/271,268 entitled "Vehicle Oil Waste Recovery and Delivery System" is pending. In this system, a spring actuated oil pan drain valve is screwed into the oil pan in lieu of an oil pan drain bolt, and an oil evacuation line is connected to the oil pan drain valve to evacuate old oil from the vehicle's oil pan. Such an oil pan valve is manufactured by Femco, of Amsterdam, Netherlands. Thereafter, new oil is added to the vehicle. However, even with this advanced system, on occasions, some users have inadvertently attempted to remove the waste oil evacuation line before all the waste oil is removed from the oil drain pan, which has resulted in spillage.

There accordingly remains a need for a leakproof valve which can only be opened and closed by its state of engagement or disengagement with an oil drain valve or another particular matting fitting on a vessel or supply of fluid from which fluid will be transferred.

BRIEF DESCRIPTION OF THE INVENTION

In a first aspect the invention is a leakproof dual action valve which is operated by its relative state of engagement and disengagement to a complementary, mating, spring actuated valve that is positionable on a fluid supply, said spring actuated valve having a valve body with an internal bore, a forward end having an external seat, and a threaded rear end; a plunger piston having a head which is fluid tightly seatable on the external seat, the head having a valve stem extending rearwardly therefrom into the internal bore, with a connected, terminating pusher portion located inside the internal bore; and a spring means having a predetermined biasing strength which biases the head of the plunger piston against the external seat to prevent fluid from passing through the spring actuated valve; said dual action valve comprising:

an engagement sleeve with an internal bore, a threaded front region, a rear region, and a stop means located rearwardly of said threaded front region inside of said bore;

a piston carrier with a front region, a rear region, and an internal longitudinal bore, said front region of said piston carrier being liquid tightly engaged with said rear region of said engagement sleeve, said piston carrier having a stop means in its internal longitudinal bore and said rear region having a terminal sealing seat;

a generally cylindrical piston body with a longitudinal fluid channel with a front region, a rear region, and a stop means extending radially outwardly from said cylindrical piston body, said piston body being movably located in said engagement sleeve, such that said piston body stop means is rearward of said piston carrier stop means, and with the rear region of the piston body being fluid tightly contacting said internal longitudinal bore of said piston body, said piston body being moveable forwardly and rearwardly within said engagement sleeve;

a plunger valve having a sliding piston body contacting portion, a valve stem extending rearwardly from the sliding piston body contacting portion, and a seating head positioned on a terminal end of said the valve stem, said seating head being fluid tightly seatable with sealing seat on the piston carrier; and a biasing spring with a predetermined biasing strength, which is positioned inside said internal longitudinal bore of said piston carrier, said biasing spring having a first end being placed adjacent said stop means of the piston carrier and with a second end being placed against said sliding piston body contacting portion, said coil spring tending to bring the plunger valve's seating head into sealing contact with said sealing seat of said piston carrier;

wherein in the use of said leakproof dual action valve, when said threaded front region of said engagement sleeve is screwed onto a matting, spring actuated valve on a source of fluid, said sliding piston body of said dual action valve will be brought into contact with the pusher plate of the spring actuated valve's plunger piston and said sliding piston body contacting portion of said plunger valve, and simultaneously push the spring actuated valve's plunger piston's head away from the external seat of the valve body and push said plunger valve's seating head away from said terminal sealing seat, to thereby allow fluid to flow through the spring actuated valve and through the dual action valve, and wherein when said engagement sleeve is unscrewed from the spring actuated valve, any flow of fluid through the spring actuated valve and dual action valve will be stopped.

BRIEF DESCRIPTION OF THE DRAWINGS

FIG. 2 is a perspective view of a spring-activated valve the dual action value of the invention is to be joined to.

DETAILED DESCRIPTION OF THE INVENTION

Figure 1:
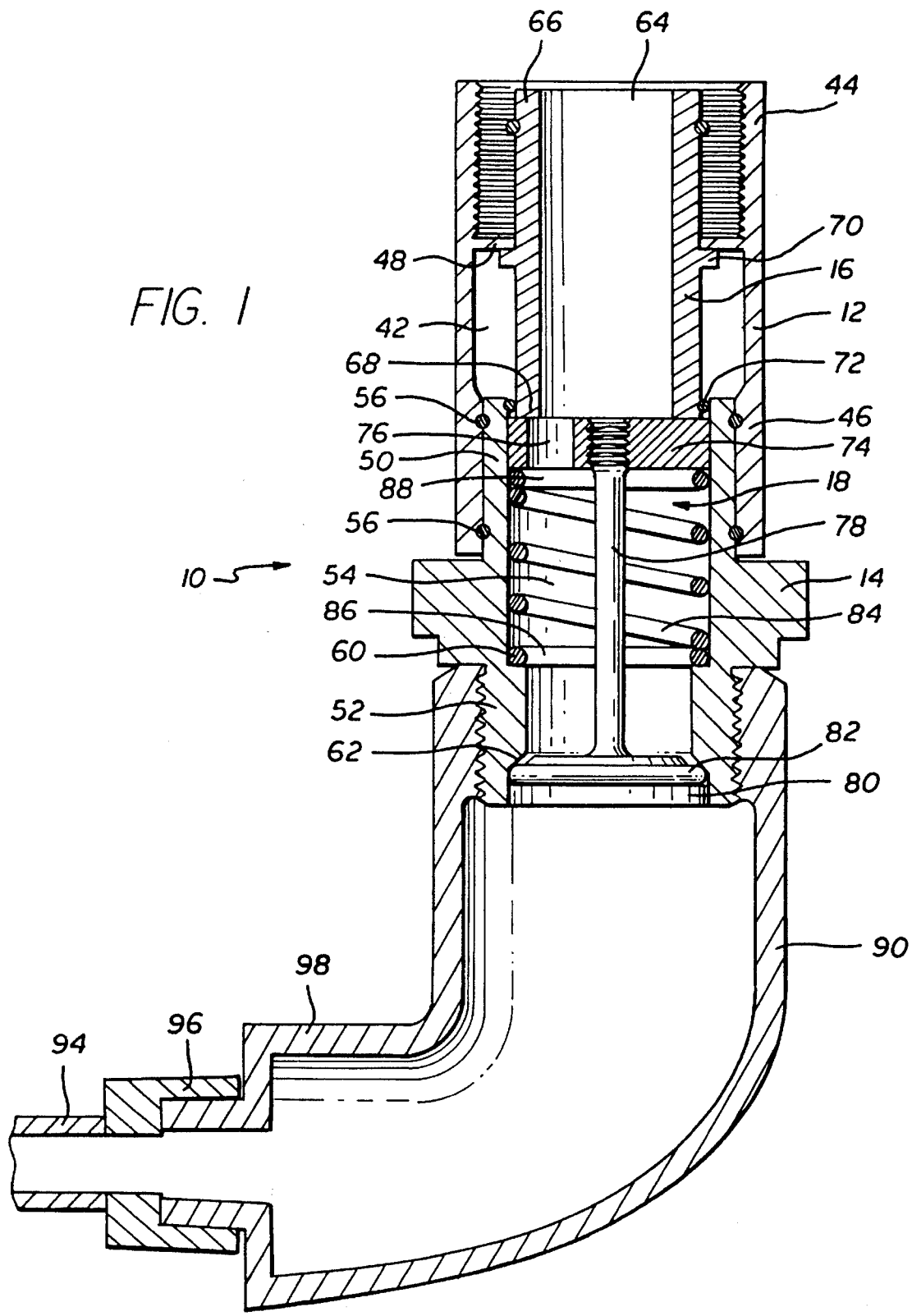
FIG. 1 is a cross-sectional view of the leakproof dual action valve of the invention.

Referring to FIG. 1, a perspective view of the leakproof dual action fluid transfer valve of the invention (the device 10) is shown. The device 10 has four main parts. These are an engagement sleeve 12, a piston carrier 14, a piston body 16, and a plunger valve 18.

Figure 2:
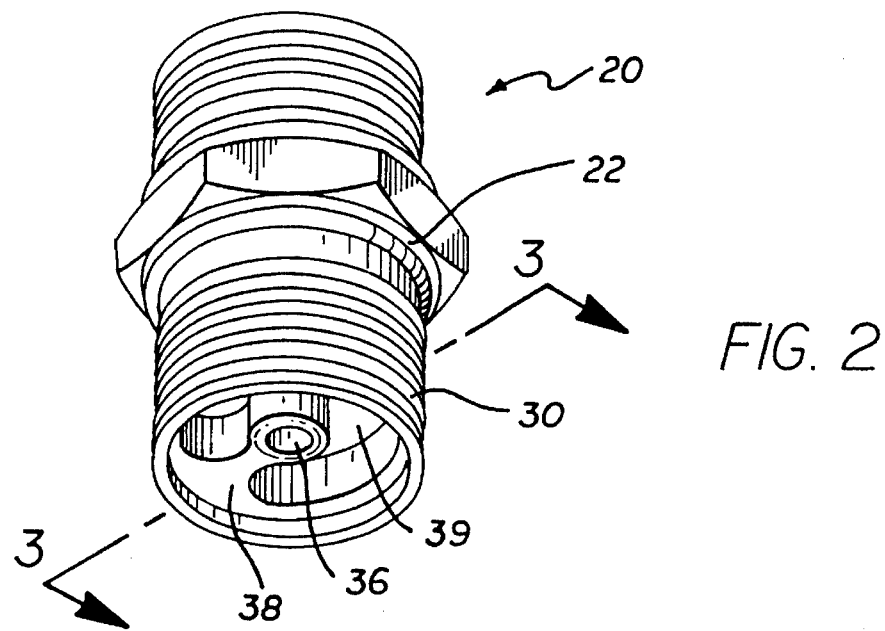
Figure 3:
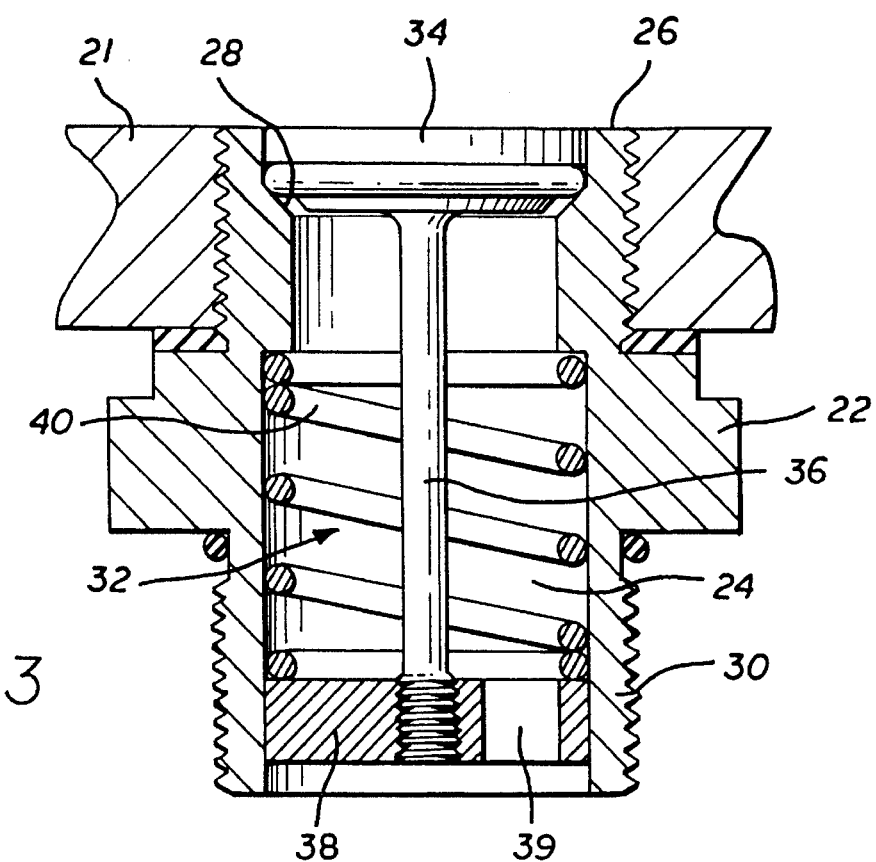
FIG. 3 is a cross-sectional view of the spring activated valve of FIG. 1, through lines 3—3, shown screwed into a wall of a fluid supply.
Figure 4:
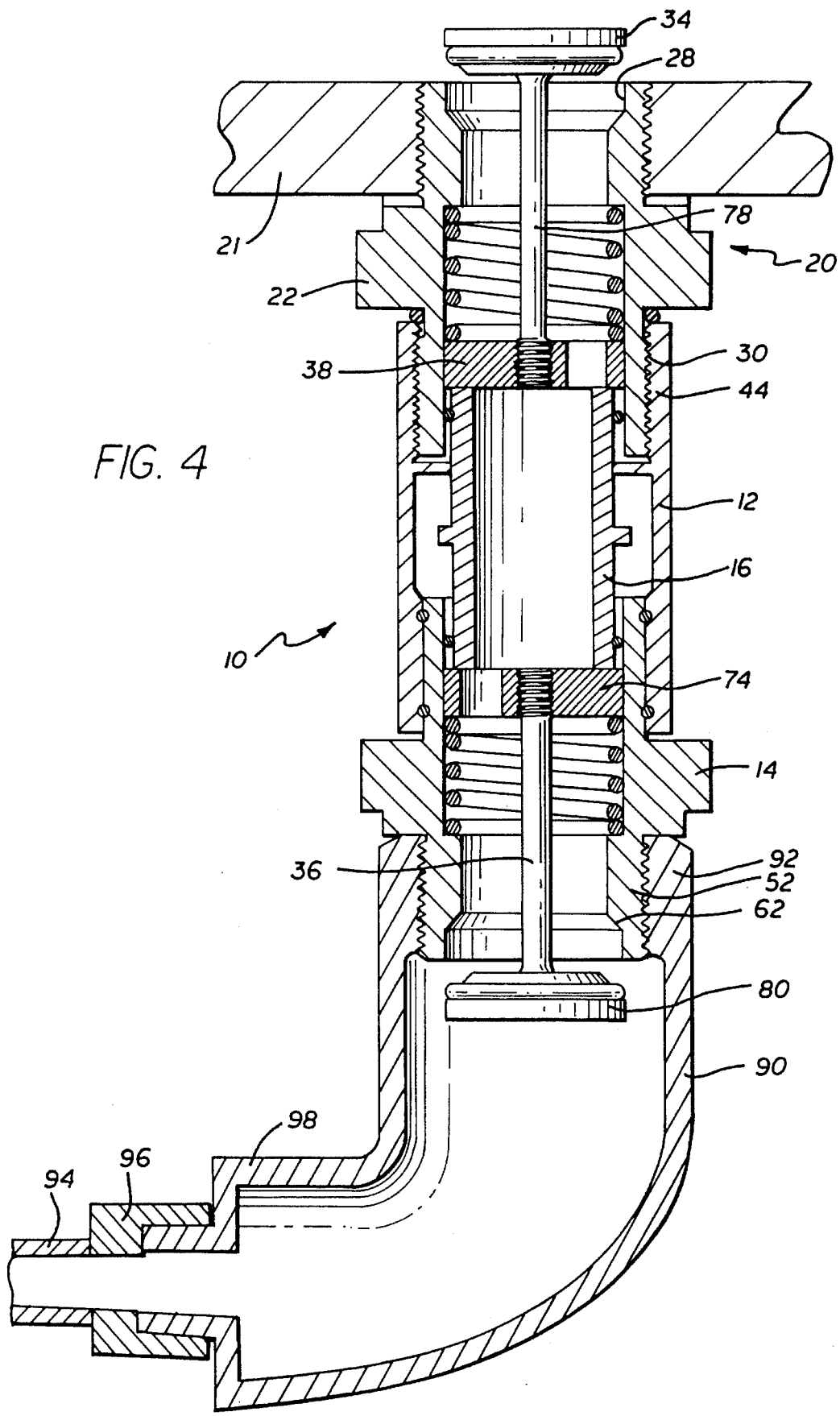
FIG. 4 is a cross-sectional view of the dual action valve of the invention, coupled to the spring activated valve of FIGS. 2 and 3, in a state of operation to allow fluid to be transferred.

The leakproof dual action valve 10 of the invention is designed by be operated by its relative state of engagement and disengagement to a complementary, mating, spring actuated valve 20 positioned on a fluid supply, i.e. screwed into an oil pan 21 of a vehicle. Referring to FIGS. 2 to 4, the mating, spring actuated valve 20 has a valve body 22 with an internal bore 24, a forward end 26 having an external seat 28, and a threaded rear end 30. A plunger piston 32 has a head 34 which is fluid tightly seatable on the external seat 28. The head 34 has a valve stem 36 extending rearwardly therefrom into the internal bore 24, and has a connected, terminating pusher portion 38 with a fluid passage 39 which is slideably located inside the internal bore 24. A spring means 40, having a predetermined biasing strength, is used to bias the head 34 of the plunger piston 32 against the external seat 28 to prevent fluid from passing through the spring actuated valve 20. Such a spring activated valve 20 is available from Femco, of Amsterdam, the Netherlands distributed in the U.S. by ETTCO America, 1245 Maxwell Road, Box 89, Haslet, Tex. 76052. A cap (not shown) can be screwed onto the theaded rear end 30 of the spring actuated valve 20 which it is not being coupled to the valve 10 of the invention. Such a cap will provide an added degree of security against leakage of fluid out of the valve 20.

Referring again to FIG. 1, to the leakproof dual action transfer valve 10, its engagement sleeve 12 has an internal bore 42, a threaded front region 44, a rear region 46, and a stop means 48 located rearwardly of said threaded front region 44 and protruding into the internal bore 42. The piston carrier 14 has a front region 50, a rear region 52, and an internal longitudinal bore 54. The front region 50 of the piston carrier 14 is designed to liquid tightly engage with said rear region 46 of said engagement sleeve 12, and can utilize O-rings 56 placed between the front region 50 of the piston carrier 14 and rear region 46 of the engagement sleeve 12 to form the liquid tight seal, with retention means used to retain the engagement sleeve 12 and piston carrier 14 together. The retention means can comprise a set screw (not shown) placed in the engagement sleeve 12 which will ride in a slot (not shown) on the piston carrier 14 to allow the engagement sleeve 12 and piston carrier 14 to rotate relative to each other. Other known means can also be employed. The piston carrier 14 has a stop means 60 protruding into its internal longitudinal bore 54 near the rear region 52. The rear region 52 has a terminal sealing seat 62 at its terminal end.

The piston body 16 is generally cylindrical in shape and has a longitudinal fluid channel 64 running therethrough from its front region 66 to its rear region 68. A stop means 70 extends radially outwardly from the cylindrical piston body 16, with the piston body 16 being movably located in the engagement sleeve 12, such that the piston body's stop means 70 is positioned rearward of the piston carrier stop means 48, and with the rear region 68 of the piston body 16 being in fluid tight contact with the internal longitudinal bore 54 of the piston body 14. The piston body 16 is thus moveable forwardly and rearwardly within the engagement sleeve 12. An O-ring 72 can provide such fluid tight sealing.

The plunger valve 18 has a sliding piston body contacting portion 74 with a fluid opening 76, a valve stem 78 extending rearwardly from the sliding piston body contacting portion 74, and a seating head 80 positioned on the terminal end of the valve stem 78. The seating head 80 is shaped to be fluid tightly seatable with the sealing seat 62 on the piston carrier 14. An O-ring 82 placed on the seating head 80 provides an added degree of sealing capability. A biasing spring 84 with a predetermined spring force is positioned inside the internal longitudinal bore 54 of the piston carrier 14, with a first end 86 of the biasing spring 84 being placed adjacent the stop means 60 of the piston carrier 14 and with a second end 88 being placed against the sliding piston body contacting portion 74. This biasing spring ideally comprises a coil spring. The coil spring 84 tends to bring the plunger valve's seating head 80 into sealing contact with the sealing seat 62 of the piston carrier 14.

Referring to FIG. 4, in the normal use of said leakproof dual action valve 10 of the invention, when the threaded front region 44 of the engagement sleeve 12 is screwed onto the matting, threaded rear end 30 of the spring actuated valve 20 which is screwed into a source of fluid (i.e. an oil pan or oil filter), the piston body 16 of the dual action valve 10, will simultaneously push against the pusher portion 38 of the spring actuated valve 20 and push its head 34 away from the external seat 28, and push against the sliding piston body contacting portion 74 of the plunger valve 18, to thereby push the plunger valve's 18 seating head 80 away from the terminal sealing seat 62, to thereby allow fluid to flow through the spring actuated valve 20 and through the dual action valve 10. As the engagement sleeve 12 is unscrewed from the spring actuated valve 20, the spring actuated valves plunger piston head 34 and the plunger valve's 18 seating head 80 both reseat on their respective seals, and any flow of fluid through the spring actuated valve 20 and the dual action valve 10 will be stopped. The biasing spring 84 ideally comprises a coil spring having a spring tension generally matched to the spring force of the biasing spring 40 of the spring actuated valve 20.

The rear region 52 piston carrier portion 14 is adapted to be engaged (i.e. by threads) to a coupler or elbow 90 at a first end 92, itself is adopted to attach to a vacuum hose 94, i.e. by quick-coupler connectors 96 and 98. The vacuum hose 94 will carry the transferred fluid.

In addition for use with the spring actuated valve 20 of FIGS. 3 and 4, the dual action fluid transfer valve 10 is also designed for use with co-inventor James E. Clark II's screw-in oil filter drain devices of U.S. patent application Ser. No. 08/300,402, filed Sep. 2, 1994, entitled "Device for Draining Fluid From A Container," and the co-inventors' contemporaneous filed patent application entitled "Improved Device For Draining Fluid From a Container," U.S. patent application Ser. No. 08/384,946.

The drawings and the foregoing description are not intended to represent the only form of the invention in regard to the details of its construction and manner of operation. In fact, it will be evident to one skilled in the art that modifications and variations may be made without departing from the spirit and scope of the invention. Changes in form and in the proportion of parts, as well as the substitution of equivalents, are contemplated as circumstances may suggest or render expedient; and although specific terms have been employed, they are intended in a generic and descriptive sense only and not for purpose of limitation, the scope of the invention being delineated in the following claims:

I claim:

1. A leakproof dual action valve which is operated by its relative state of engagement and disengagement to a complementary, mating, spring actuated valve that is positionable on a fluid supply, said spring actuated valve having a valve body with an internal bore, a forward end having an external seat, and a threaded rear end; a plunger piston having a head which is fluid tightly seatable on the external seat, the head having a valve stem extending rearwardly therefrom into the internal bore, with a connected, terminating pusher portion located inside the internal bore, said pusher portion having a fluid opening; and a spring means having a predetermined biasing strength which biases the head of the plunger piston against the external seat to prevent fluid from passing through the spring actuated valve; said dual action valve comprising:

- an engagement sleeve with an internal bore, a threaded front region, a rear region, and a stop means located rearwardly of said threaded front region inside of said bore;
- a piston carrier with a front region, a rear region, and an internal longitudinal bore, said front region of said piston carrier being liquid tightly engaged with said rear region of said engagement sleeve, said piston carrier having a stop means in its internal longitudinal bore and said rear region having a terminal sealing seat;
- a generally cylindrical piston body with a longitudinal fluid channel with a front region, a rear region, and a stop means extending radially outwardly from said cylindrical piston body, said piston body being movably located in said engagement sleeve, such that said piston body stop means is rearward of said piston carrier stop means, and with the rear region of the piston body being fluid tightly contacting said internal longitudinal bore of said piston body, said piston body being moveable forwardly and rearwardly within said engagement sleeve;
- a plunger valve having a sliding piston body contacting portion with a fluid opening formed therethrough, a valve stem extending rearwardly from the sliding piston body contacting portion, and a seating head positioned on a terminal end of said the valve stem, said seating head being fluid tightly seatable with said sealing seat on the piston carrier; and
- a biasing spring with a predetermined biasing strength, which is positioned inside said internal longitudinal bore of said piston carrier, said biasing spring having a first end being placed adjacent said stop means of the piston carrier and with a second end being placed against said sliding piston body contacting portion, said coil spring tending to bring the plunger valve's seating head into sealing contact with said sealing seat of said piston carrier;
- wherein in the use of said leakproof dual action valve, when said threaded front region of said engagement sleeve is screwed onto said mating, spring actuated valve on a fluid supply, said sliding piston body of said dual action valve will be brought into contact with a pusher plate of the spring actuated valve's plunger piston and said sliding piston body contacting portion of said plunger valve, and simultaneously push the spring actuated valve's plunger piston's head away from the external seat of the valve body and push said plunger valve's seating head away from said terminal sealing seat, to thereby allow fluid to flow through the spring actuated valve and through the dual action valve, and wherein when said engagement sleeve is unscrewed from the spring actuated valve, any flow of fluid through the spring actuated valve and dual action valve will be stopped.

2. The leakproof dual action valve of claim 1, wherein the engagement sleeve is rotatable with respect to the piston carrier.

3. The leakproof dual action valve of claim 1, further comprising a coupler means coupled to the rear region of the piston carrier for connection to a vacuum hose.

4. The leakproof dual action valve of claim 1, wherein the biasing spring comprises a coil spring having a spring tension generally matched to the spring force of the biasing spring of the spring activated valve.

* * * * *